(12) United States Patent
Pelletier et al.

(10) Patent No.: US 8,767,604 B2
(45) Date of Patent: Jul. 1, 2014

(54) METHODS AND ARRANGEMENTS IN A TELECOMMUNICATION SYSTEM

(75) Inventors: Ghyslain Pelletier, Boden (SE); Stefan Parkvall, Stockholm (SE); Bengt Lindoff, Bjarred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 98 days.

(21) Appl. No.: 13/258,275

(22) PCT Filed: May 29, 2009

(86) PCT No.: PCT/SE2009/050626
§ 371 (c)(1),
(2), (4) Date: Sep. 21, 2011

(87) PCT Pub. No.: WO2010/114447
PCT Pub. Date: Oct. 7, 2010

(65) Prior Publication Data
US 2012/0014306 A1    Jan. 19, 2012

Related U.S. Application Data

(60) Provisional application No. 61/165,205, filed on Mar. 31, 2009.

(51) Int. Cl.
*G08C 17/00* (2006.01)
*H04Q 7/00* (2006.01)
(52) U.S. Cl.
USPC ........... 370/311; 370/328; 370/329; 370/252; 370/241; 455/574
(58) Field of Classification Search
USPC ................. 370/311, 328, 329, 252, 241, 336; 455/574
See application file for complete search history.

(56) References Cited

U.S. PATENT DOCUMENTS

2006/0195576 A1    8/2006   Rinne et al.
2007/0253321 A1   11/2007   Akita et al.
(Continued)

FOREIGN PATENT DOCUMENTS

CN    101384071    3/2009
CN    101394607    3/2009
(Continued)

OTHER PUBLICATIONS

International Preliminary Report on Patentability issued for International Application No. PCT/SE2009/050626 on Jul. 4, 2011.
(Continued)

*Primary Examiner* — Charles C Jiang
*Assistant Examiner* — Jamal Javaid
(74) *Attorney, Agent, or Firm* — Myers Bigel Sibley & Sajovec, P.A.

(57) ABSTRACT

The present invention relates to methods and arrangements in a multi-carrier system. It also assumes independent DRX (Discontinuous reception) functionality on respective component carriers and the possibility for one carrier, e.g. the anchor carrier to initiate a change of DRX state for another component carrier. The basic concept of the present invention is to introduce a new "dormant" state in the DRX logic, whereby the dormant state can be used for non-anchor carrier components. The dormant DRX state implies that a carrier of a UE having this state is not required to monitor system signaling. In embodiments of the present invention this new state is introduced for a particular component carrier (e.g. non-anchor component carrier) for a UE operating in a multi-carrier system, and how to perform the transitions to and from the dormant DRX state implicitly, e.g. based on configured timer(s) for the component carrier or explicit signaling in a different (e.g. anchor) component carriers.

12 Claims, 5 Drawing Sheets

(56) References Cited

U.S. PATENT DOCUMENTS

2009/0016252 A1* 1/2009 Ho et al. .......... 370/311
2010/0238880 A1* 9/2010 Wu .............. 370/329
2011/0128925 A1   6/2011 Lindoff et al.

FOREIGN PATENT DOCUMENTS

WO   WO 2008/137596 A1   11/2008
WO   WO 2009/120124      10/2009
WO   WO 2010/048178 A1    4/2010

OTHER PUBLICATIONS

International Search Report issued for International Application No. PCT/SE2009/050626 on Dec. 11, 2009.
Written Opinion of the International Searching Authority issued for International Application No. PCT/SE2009/050626 on Dec. 11, 2009.
Ericsson et al., "Text Proposal for DC-HSDPA Assumptions and Standards Impact", 3GPP Draft; R1-082249 Text Proposal for DC-HSDPA Assumptions and Standards Impact, $3^{rd}$ Generation Partnership Project (3GPP), Mobile Competence Centre; 650, Route Des Lucioles; F-06921 Sophia-Antipolis Cedex; France, vol. RAN WG1, No. Kansas City, USA; May 23, 2008.
Japanese Office Action Corresponding to Japanese Patent Application No. 2012-503361; Date Mailed: Jun. 5, 2013; Foreign Text, 2 Pages.
Lindoff et al. "DRX Functionality in Multi-Carrier LTE", U.S. Appl. No. 61/039,207, filed Mar. 25, 2008 (9 pages).
Wu "Method for Handling DRX in Multiple Connections in a Wireless Communications System and Related Communication Device", U.S. Appl. No. 61/160,714, filed Mar. 17, 2009 (17 pages).
Chinese Office Action (Foreign Text 7 pages, English Translation 13 pages) corresponding to Chinese Patent Application No. 200980159712.5; Issue Date: Dec. 6, 2013.
Ericsson, "Carrier aggregation in LTE-Advanced", TSG-RAN WG1 #53bis, R1-082468, Warsaw, Poland, Jun. 30-Jul. 4, 2008, 6 Pages.

\* cited by examiner

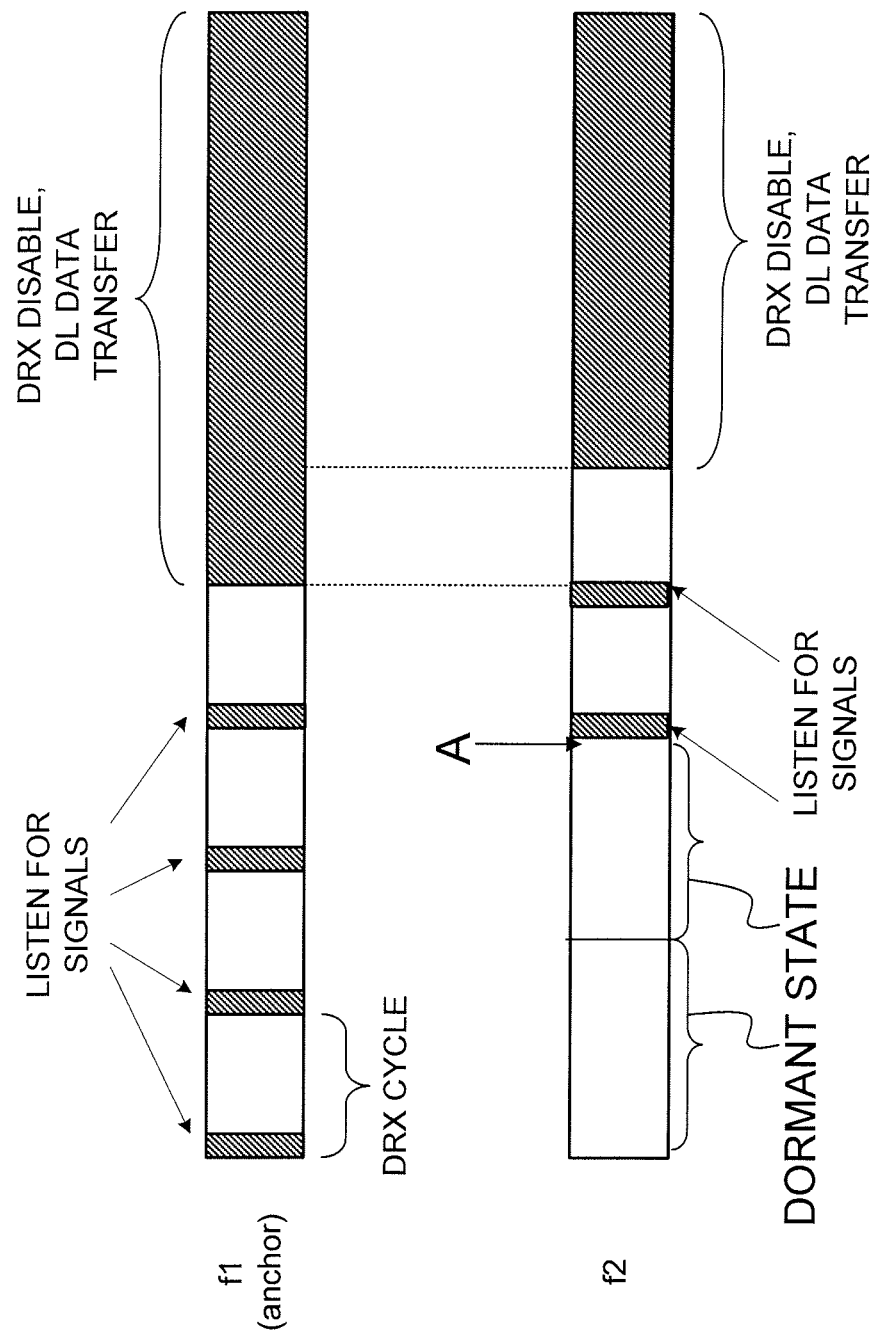

METHODS AND ARRANGEMENTS IN A TELECOMMUNICATION SYSTEM

CROSS REFERENCE TO RELATED APPLICATION

This application is a 35 U.S.C. §371 national stage application of PCT International Application No. PCT/SE2009/050626, filed on May 29, 2009, which claims the benefit of priority of U.S. Provisional Application No. 61/165,205 filed on Mar. 31, 2009. The disclosures of both of the above referenced applications are hereby incorporated herein in their entireties by reference.

TECHNICAL FIELD

The present invention relates to methods and arrangements in a telecommunication system, and in particular to methods and arrangements for discontinuous reception in a multi-carrier system.

BACKGROUND

Universal Mobile Telecommunications System (UMTS) is one of the third-generation (3G) mobile telecommunications technologies. Currently, the most common form of UMTS uses Wideband Code Division Multiple Access (W-CDMA) as the radio access technology. UMTS is standardized by the Third Generation Partnership Project (3GPP). UMTS, using W-CDMA, supports up to 21 Mbit/s data transfer rates with HSDPA (High Speed Data Packet Access).

In 3GPP, work is ongoing on specifications of the UMTS Terrestrial Radio Access Network (W-CDMA) evolution (E-UTRA) as part of the Long Term Evolution (W-CDMA) effort. In forthcoming evolutions of cellular system standards like LTE the maximum data rate will increase. Higher data rates typically require larger system bandwidths. However, since radio spectrum is a limited resource and since many operators and systems need to share the same radio resource, there is very complicated to find a large amount of contiguous free spectrum, e.g. 100 MHz.

One method to overcome this problem is to aggregate non-contiguous spectrum and thereby from a baseband point of view a large system bandwidth is created. The benefit with such a solution is that then it will be possible to generate sufficiently large bandwidth for supporting data rates up to (and above) 1 Gb/s.

Furthermore, such a scenario also makes it possible to adapt the spectrum parts to the current situation and geographical position making such a solution very flexible. A straightforward evolution of current cellular systems, like LTE, to support non-contiguous spectrum is to introduce multi-carrier. That means, for each spectrum, a "chunk" represents a "legacy" system, i.e. a single carrier system, and the future multi-carrier mobile terminals will be capable to receive multiple number of legacy carriers of different bandwidths transmitted at different carrier frequencies.

A discontinuous reception (DRX) mechanism is a mechanism allowing the UE to stop monitoring layer 1/layer 2 (L1/L2) control signaling channels, which allows the UE to e.g. turn off some or all of its radio circuitry, to decrease the power consumption. The DRX is applicable when a UE has an established RRC connection (i.e. when UE is in $RRC_{13}$ CONNECTED state).

DRX in LTE specifies two pre-defined cycles, a long DRX cycle (longDRX-Cycle) and a short DRX cycle (shortDRX-Cycle). When DRX is configured, the network always configures the UE with the long cycle and may optionally configure the UE with the short cycle, in which case the short cycle always is a fraction of the length of long cycle.

At the beginning of the DRX cycle, the UE shall monitor the Packet Data Control Channel (PDCCH) over a certain amount of Transmission Time Intervals (TTIs); this is also referred to as the DRX on-duration period which is controlled by the DRX OnDurationTimer. The beginning of the cycle is determined by the system frame number (SFN), specified as an integer offset of the DRX start offset.

FIG. 1 shows an example of a DRX cycle pattern, i.e. the periodic repetition of the DRX on-duration period followed by a possible period of inactivity.

The transition from the short cycle to the long cycle occurs after a period of consecutive TTIs for which the UE has not been scheduled using the PDCCH by using the drxShortCycleTimer. At most one DRX cycle is active at any given time.

The PDCCH carries downlink scheduling assignments as well as uplink scheduling grants. When the UE successfully decodes PDCCH, it starts (or restarts) the DRX Inactivity Timer (drx-InactivityTimer) and monitors PDCCH until the timer expires. It also starts a HARQ RTI Timer for the relevant HARQ process, to handle possible retransmission; when the HARQ RTT timer expires and the data was not successfully decoded, the UE starts the DRX Retransmission Timer (drx-RetransmissionTimer) when it monitors the PDCCH. Whether the UE is awake (i.e. monitors the PDCCH) or asleep (i.e. not monitors the PDC) after the DRX on-duration period thus depends on the scheduling activity for the UE, i.e., it depends on the reception and successful decoding of the PDCCH control signaling during the period when the UE is already monitoring PDCCH i.e. the DRX Active Time.

The DRX Active Time includes the time while the DRX On Duration Timer (OnDurationTimer) or the DRX Inactivity Timer (drx-InactivityTimer) or a DRX Retransmission Timer (drx-RetransmissionTimer) is running. Note that the Active Time also includes subframes during contention resolution for random access, subframes while a scheduling request is pending and subframes during which an uplink grant for a pending HARQ retransmission can occur and other prescriptions as described in TS 36.321 subclause 5.7.

SUMMARY

It has been observed that it is a problem to design an LTE mobile terminal which is efficiently capable to perform multi-carrier operations. Accordingly, it is an object of the present invention to provide an efficient multi-carrier system design taking into account the challenges in the mobile terminal front end receiver design.

The methods and arrangements proposed herein are relevant to a multi-carrier system. It also assumes independent DRX (Discontinuous reception) functionality on respective component carriers and the possibility for one carrier, e.g. the anchor carrier to initiate a change of DRX state for another component carrier. Thus, the basic concept of the present invention is to introduce a new "claimant" state in the DRX logic, whereby the dormant state can be used for non-anchor carrier components. The dormant DRX state implies that a carrier of a UE having this state is not required to monitor system signaling.

In embodiments of the present invention this new state is introduced for a particular component carrier (e.g. non-anchor component carrier) for a UE operating in a multi-carrier system, and how to perform the transitions to and from the dormant DRX state implicitly, e.g. based on configured timer (s) for the component carrier or explicit signaling in a different (e.g. anchor) component carriers.

According to a first aspect of the present invention a network node is provided. The network node is connectable to a wireless communication system configured for wireless communication over multiple carriers with a UE. The network node comprises a processing unit for controlling DRX reception of the UE. The processing unit is adapted to configure the UE to enter a first DRX state on at least a first carrier of the multiple carriers, wherein the UE is not required to monitor system signaling on the at least the first carrier when being in the first DRX state. The network node further comprises a transmitter for sending the configuration to the UE on a second carrier.

According a second aspect of the present invention a UE is provided. The UE is connectable over multiple carriers to a network node of a wireless communication system wherein the UE is capable of DRX reception. The UE comprises a processing unit for entering a first DRX state on at least a first carrier of the multiple carriers, wherein the UE is not required to monitor system signaling on the at least the first carrier when being in the first DRX state.

According to third aspect of the present invention a method in network node is provided. The network node is connectable to a wireless communication system configured for wireless communication over multiple carriers with a UE. The network node controls DRX reception of the UE. In the method, the UE is configured to enter a first DRX state on at least a first carrier of the multiple carriers, wherein the UE on the at least the first carrier is not required to monitor system signaling when being in the first DRX state. The configuration to the UE is sent on a second carrier.

According to a fourth aspect of the present invention a method in a UE is provided. The UE is connectable over multiple carriers to a network node of a wireless communication system and is capable of DRX reception. In the method, a first DRX state is entered on at least a first carrier of the multiple carriers, wherein the UE on the at least the first carrier is not required to monitor system signaling when being in the first DRX state.

According to embodiments of the present invention the first and second carrier may be the same carrier, i.e., the second carrier is a carrier of the at least the first carrier of the multiple carriers. Alternatively, the second carrier may be another carrier than the first carrier, i.e. the second carrier is a different carrier than the at least the first carrier of the multiple carriers.

An advantage with embodiments of the present invention is that the embodiments are applicable in both multi-carrier LTE and 3G HSPA (High Speed Packet Access) systems.

A further advantage is that by introducing a dormant state to DRX on specific component carriers in a multi-carrier system, a better tradeoff between mobile terminal power consumption and downlink throughput can be achieved without impacting the ability for the system to quickly increase data rates when needed.

The embodiments of the present invention is especially relevant for UEs transmitting with low rate traffic, or even from the network's perspective in case of high network load in one of the component carriers due to e.g. many UEs not capable of multi-carrier transmission.

Other objects, advantages and novel features of the invention will become apparent from the following detailed description of the invention when considered in conjunction with the accompanying drawings.

BRIEF DESCRIPTION OF THE DRAWINGS

FIG. 2 illustrates DRX cycles according to the first and second states according to embodiments of the present invention.

DETAILED DESCRIPTION

Figure 1:
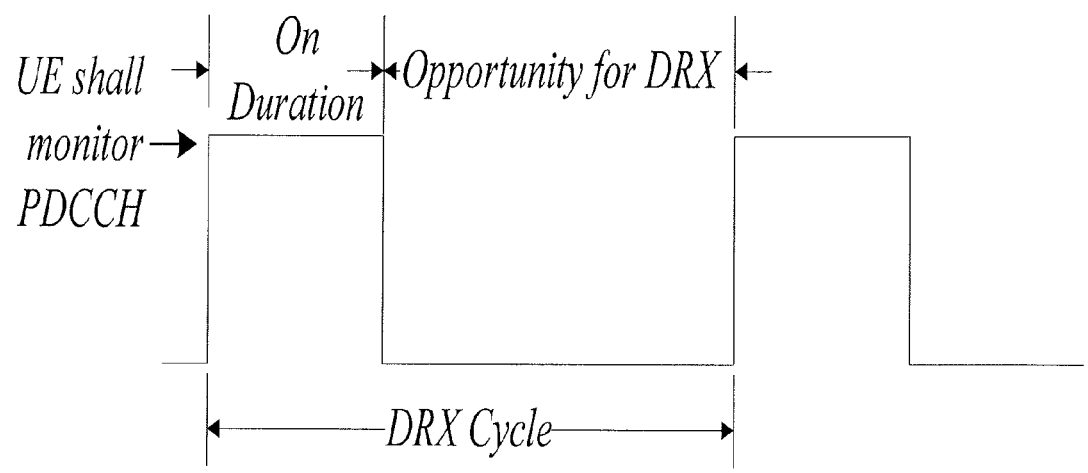
FIG. 1 illustrates an LTE DRX cycle and OnDuration according to prior art.

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

Although the multi-carrier LTE approach may seem to be straightforward approach, it is a non-trivial task to design a multi-carrier LTE capable mobile terminal. The aggregated spectrum approach implies that the radio receiver architecture for such a mobile terminal will become more complicated than a terminal only capable to receive contiguous system bandwidths. The reason for this is that the front end radio needs to be able to suppress blocking signals in between the spectrum resource blocks. Different kind of radio architecture can be used for handling this problem; however they typically have drawbacks compared to standard continuous system bandwidth receivers in terms of power consumption.

One aspect relevant to DRX, UE power consumption and multi-carrier LTE is the distribution of the power consumption between different components of a transceiver, and their respective startup times. One third of the power may be consumed in the base band (BB) component, which requires 5 to 10 TTIs (ms) to reactivate. Even when DRX is enabled, by using the short or long cycle, the base band component has to be awake every DRX cycle for at least the combined "On Duration" period and the startup time of the base band component. It is possible to assume that some multi-carrier UE architectures will rely on multiple transceiver circuits (comprising transmitter+power amplifier, receiver, baseband and baseline baseband) maybe even up to one circuit per supported component carrier. In case of low UE activity, the time for which the UE is awake per DRX cycle for a carrier component for which the UE is not scheduled can amount to a significant power waste and battery drain.

Therefore there is a need for an efficient multi-carrier LTE system design taking into account the challenges in the mobile terminal front end receiver design.

The embodiments of the present invention described herein relate to a multi-carrier system such as an LTE system. It also assumes independent DRX (Discontinuous reception) functionality on the respective component carrier and the possibility for the anchor carrier to initiate a change of DRX state for another component carrier. The anchor carrier is associated with control signaling and system information while non-anchor carriers only are used for carrying data providing more bandwidth. It should also be noted that the terms "component carrier" and "carrier" are used interchangeably.

The basic concept of the present invention is to introduce a new DRX states also referred to as a "dormant" state in the DRX logic. During the new DRX state introduced by the present invention, the UE is not required to monitor system signaling on a carrier which has entered the dormant state, also referred to as a first DRX state. This is illustrated in FIG. 2, where the carrier denoted f2 has entered the dormant state during the two first cycles. In the next two cycles normal DRX is entered. The dormant state could be used for non-anchor carrier components. If a non-anchor carrier has entered the dormant state, the anchor carrier is still active, as in carrier f1 in FIG. 2. DRX according to prior art is a higher layer functionality for saving power consumption but where the UE periodically receives system information (indicated in FIG. 2 by the area indicated "listen for signals") indicating which TTIs the mobile terminal need to read the control channels for possible reception of data, and time instant, i.e. the periodicity for channel quality indicator (CQI) measurements. By introducing a new dormant state in addition to the existing DRX long and short cycles, it is possible to achieve further power savings without any compromise in how fast data transmission in carrier in the dormant state can be resumed. That depends on that at least another carrier of the multi-carriers still is in a non "dormant" state which implies that this carrier is able to receive necessary system information such that the transmission can be resumed quickly.

In other words, it is made possible for a carrier, e.g. a non-anchor carrier to be configured with a DRX "dormant" state or cycle, using the DRX terminology. While a carrier, e.g. a non-anchor carrier is in a dormant state, the UE is not required to monitor system information on e.g. PDCCH on that carrier. When a transition to either the long or the short DRX cycle is indicated for the carrier in the dormant state on a different carrier, e.g. the anchor carrier, the UE starts using the indicated cycle and wakes up either (1) as soon as possible for the transceiver, e.g. consider some offset in time or some UE processing time, or alternatively (2) at the start of the next "On-duration" as indicated by the configured DRX Start Offset for the cycle.

Figure 3A:
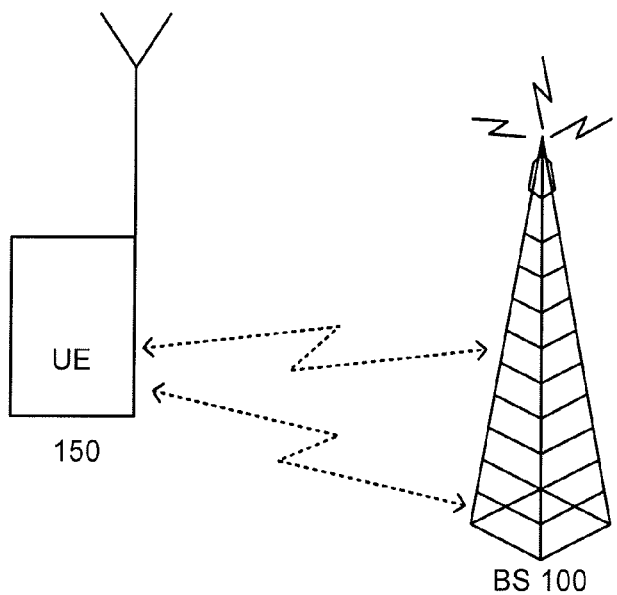
FIG. 3a illustrates a telecommunication network wherein embodiments of the present invention may be implemented.
Figure 3B:
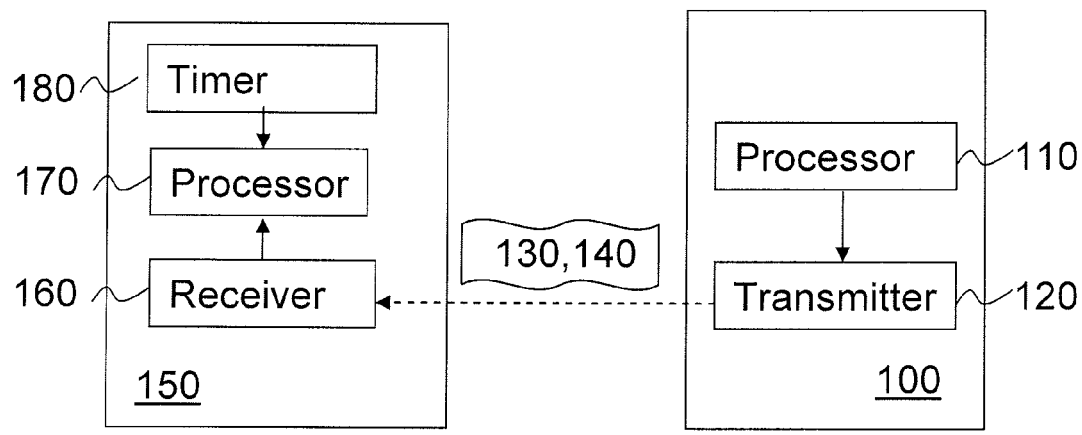
FIG. 3b illustrates the arrangements according to embodiments of the present invention.

According to an embodiment of the present invention, as illustrated in FIG. 3, a network node 100 connectable to a wireless communication system configured for wireless communication over multiple carriers with a UE 150 is provided. The network node may be a base station such as an eNodeB in an LTE network. The network node 100 comprises a processing unit 110 for controlling DRX reception of the UE 150. The processing unit 110 is adapted to configure the UE 150 to enter a first DRX state on at least a first carrier of the multiple carriers. During the first DRX state, the UE 150 is not required to monitor system signaling on the at least the first carrier when being in the first DRX state. The network node 100 further comprises a transmitter 120 for sending the configuration 130 to the UE 150 on a second carrier.

The processing unit is further adapted to control transition between said first DRX state and a second DRX state, i.e. both from the first state and to the second state and from the second state to the first state, where the UE on a carrier being in the second DRX state is required to periodically monitor system signaling and wherein the transmitter is further configured to send control signaling 140 to control said transition on the second carrier. The control signaling may be sent over layer 1 (physical layer), layer 2 (MAC) or layer 3 (RRC).

The first carrier may be a non anchor carrier and the second carrier an anchor carrier. However, both the first and the second carriers may be non-anchor carriers.

Furthermore, the UE 150 as illustrated in FIG. 3 is connectable over multiple carriers to a network node of a wireless communication system wherein the UE 150 is capable of DRX reception. According to an embodiment of the present, the UE 150 comprises a processing unit 170 for entering a first DRX state on at least the first carrier of the multiple carriers, wherein the UE 150 is not required to monitor system signaling on the at least the first carrier when being in the first DRX state. As illustrated in FIG. 3, the UE comprises a receiver 160 for receiving control information controlling transition between said first DRX state and the second DRX state on the second carrier. In addition, the receiver 160 is adapted to receive the control information 140 on an anchor carrier for controlling the UE to enter the first DRX state and wherein the processing unit 170 is adapted to configure the UE to enter said first DRX state on an non-anchor carrier in accordance with the received control information 140. Hence it should also be noted that the receiver 160 is further configured to receive configuration parameters 140 associated with the first DRX state.

Moreover, according to a further embodiment of the present invention, the UE 150 comprises a timer 180 associated with a configurable time during which the UE has not received system signaling on the at least first carrier and wherein the processing unit is adapted to configure the UE to transfer from the first to the second DRX state based on timing of said timer.

As explained above, the UE can transit back to the dormant state either by means of an explicit signaling such as PDCCH received in the concerned component carrier, or PDCCH received in a different component carrier, or a MAC control element; or an implicit indication such as the expiration of a configured timer, which timer represents an amount of time during which the UE has seen no activity, e.g. no PDCCH activity, in the concerned component carrier.

The UE always has knowledge of the DRX patterns based on the respective DRX start offset and period when in the dormant state and can thus still derive at what time the On-Duration period occurs. However, since it is dormant, the UE does not activate PDCCH monitoring in the on-duration unless a PDCCH indicating a transition to a different DRX state e.g. either long or short DRX is successfully decoded in another (e.g. anchor) component carrier.

When the terminal is connected to a network, the network informs the terminal about the main (or anchor) component carrier. Then the different DRX cycles for the different component carriers, and the configuration for the dormant state (e.g. inactivation timer) for applicable component carriers, are signaled to the terminal.

For example, a very short, or no DRX cycle, is configured on the anchor component carrier; this means that the terminal should monitor the control channels rather often on this carrier. On other carriers short DRX cycles are also configured together with e.g. an inactivation timer for the dormant state, and each of those component carrier is also configured with a DRX start offset starting at different time locations, meaning that the terminal can completely turn off its transceiver circuits on a given component carrier after some time with no activity in the component carrier e.g. when the inactivation timer expires until reactivated hence e.g. by explicit signaling from the network in the anchor component carrier reducing overall power consumption. Then the connection is started and the UE monitors control signaling on the respective component carriers according to the DRX cycle information.

In case a large downlink connection is needed to the terminal, the base station can, on the anchor carrier, send information that indicates to the terminal to perform a transition from the dormant state to another DRX cycle on the other component carrier(s), thereby making it possible for a fast switch to a very high downlink throughput without wasting unnecessary power for the inactive component carriers until first needed. Because each component carrier where a dormant state is configured has a start offset in a different time location, the network when indicating that the terminal should take one or more non-anchor carrier out from the dormant state—can select to transmit PDCCH for the terminal in the component carrier closest in time, thereby reducing delay for increasing throughput.

Figure 4:
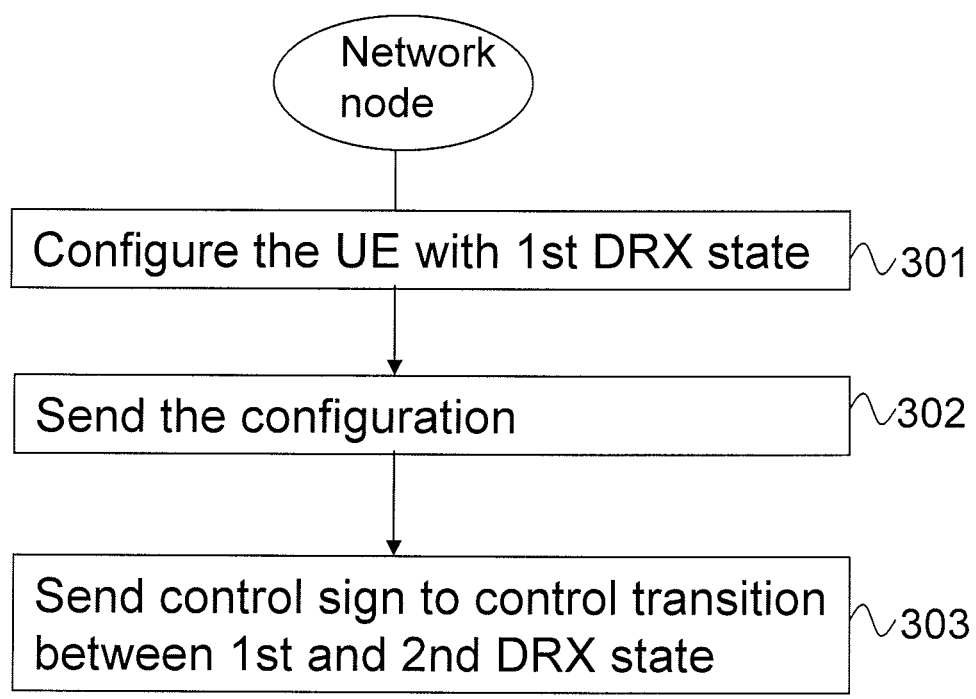
FIGS. 4 and 5 are flowcharts of the methods according to embodiments of the present invention.
Figure 5:
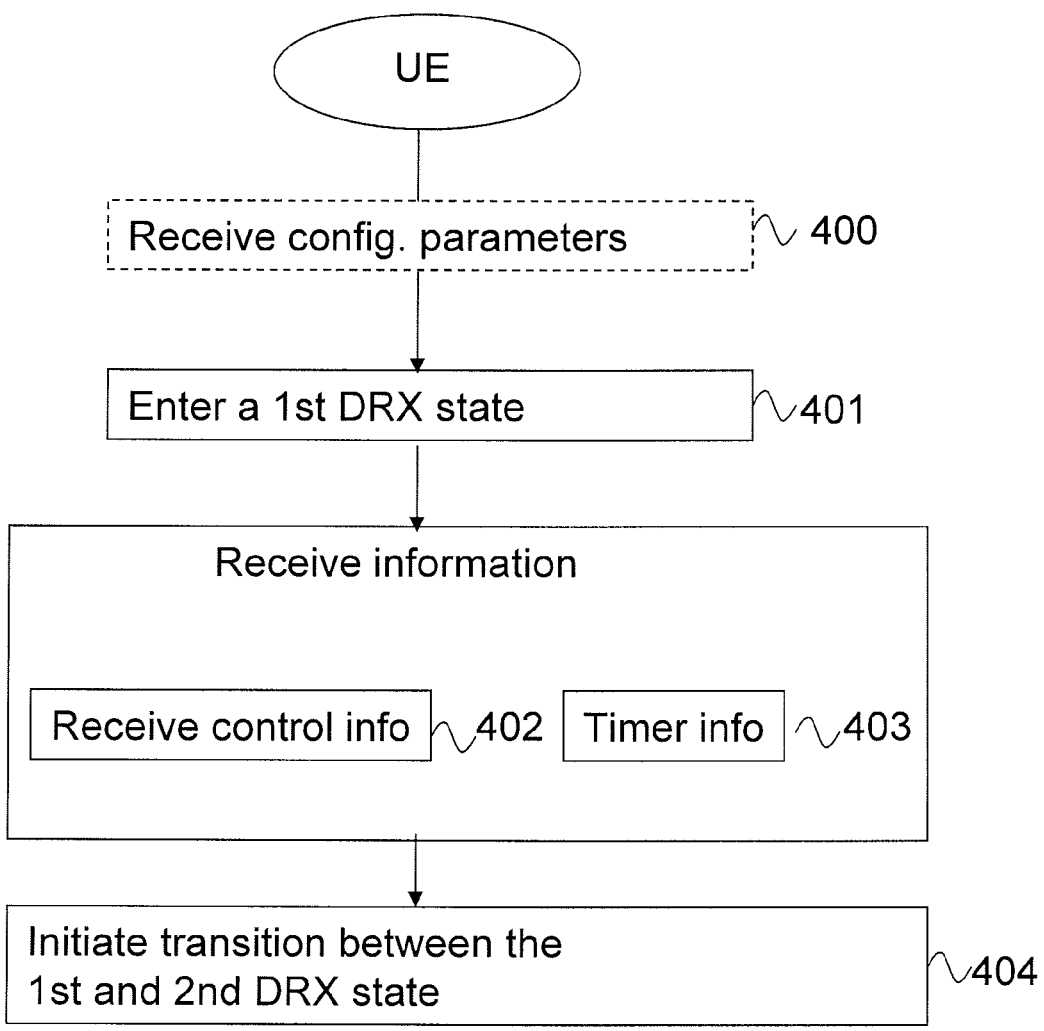

Turning now to FIGS. 4 and 5 illustrating the methods in the network node and a UE.

In FIG. 4, the method in the network node, e.g. a base station, is schematically illustrated in the flowchart. In step 301, the UE is configured to enter a first DRX state on at least a first carrier of the multiple carriers, wherein the UE on the at least the first carrier is not required to monitor system signaling when being in the first DRX state. In step 302, the configuration is sent to the UE on a second carrier. The transition is controlled 303 between said first DRX state and a second DRX state where the UE on a carrier in the second DRX state is required to periodically monitor system signaling by sending control signaling to the UE on the second carrier.

In FIG. 5, the method in the network node, e.g. a UE, according to an embodiment of the invention is schematically illustrated in the flowchart. Configuration parameters associated with the first DRX state is received in step 400. In step 401, a first DRX state on at least a first carrier of the multiple carriers is entered. Information is received controlling transition between said first DRX state and the second DRX state on a second carrier. The received information may be received control information 402 or timer information 403, wherein the timer information may be a timing 403 of a timer associated with a configurable time during which the UE has not received system information on a non-anchor carrier. In step 404, the UE transits between the DRX states according to the received information.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A User Equipment, UE, connectable over multiple carriers to a network node of a wireless communication system wherein the UE is capable of discontinuous reception (DRX), the UE comprising:
a processor configured to enter a first DRX state on a non-anchor carrier of the multiple carriers where the UE does not monitor system signaling on the non-anchor carrier over multiple DRX cycles when in the first DRX state; and
a receiver configured to receive control information on an anchor carrier controlling transition between the first DRX state of the non-anchor carrier and a second DRX state of the non-anchor carrier where the UE is required to periodically monitor system signaling on the non-anchor carrier in the second DRX state;
wherein the anchor carrier is used for control signaling and system information, and
wherein the non-anchor carrier is only used to carry data.

2. The UE according to claim 1 further comprising:
a timer associated with a configurable time during which the UE has not received system information on the non-anchor carrier,
wherein the processor is adapted to configure the UE to transfer the non-anchor carrier between the first DRX state and the second DRX state based on timing of the timer, where the UE is required to periodically monitor system signaling on the non-anchor carrier in the second DRX state.

3. The UE according to 1, wherein the receiver is configured to receive the control signaling on the anchor carrier over layer 1, layer 2 or layer 3.

4. The UE according to claim 1 wherein the non-anchor carrier is maintained in the first DRX state for multiple consecutive DRX cycles without monitoring system signaling on the non-anchor carrier.

5. The UE according to claim 4 wherein the non-anchor carrier is maintained in the first DRX state for multiple consecutive DRX cycles of the anchor carrier without monitoring system signaling on the non-anchor carrier.

6. The UE according to claim 1 wherein the control information is received on the anchor carrier to control a transition of the non-anchor carrier from the first DRX state where the UE does not monitor system signaling on the non-anchor carrier over multiple DRX cycles to the second DRX where the UE is required to periodically monitor system signaling on the non-anchor carrier.

7. A method in a User Equipment, UE, connectable over multiple carriers to a network node of a wireless communication system and capable of discontinuous reception (DRX), the method comprising:
entering a first DRX state on a non-anchor carrier of the multiple carriers where the UE does not monitor system signaling on the non-anchor carrier over multiple DRX cycles in the first DRX state; and
receiving control information on an anchor carrier controlling transition between the first DRX state and a second DRX state of the non-anchor carrier where the UE is required to periodically monitor system signaling on the non-anchor carrier in the second DRX state;
wherein the anchor carrier is used for control signaling and system information, and
wherein the non-anchor carrier is only used to carry data.

8. The method according to claim 7, further comprising:
initiating a transition of the non-anchor carrier between the first DRX state and the second DRX state based on a timing of a timer associated with a configurable time during which the UE has not received system information on the non-anchor carrier.

9. The method according to claim 7, further comprising:
receiving configuration parameters associated with the first DRX state,
wherein entering the first DRX state on the non-anchor carrier of the multiple carriers is performed based on the received configuration parameters.

10. The method according to claim 7 wherein the non-anchor carrier is maintained in the first DRX state for multiple consecutive DRX cycles without monitoring system signaling on the non-anchor carrier.

11. The method according to claim 10 wherein the non-anchor carrier is maintained in the first DRX state for multiple consecutive DRX cycles of the anchor carrier without monitoring system signaling on the non-anchor carrier.

12. The method according to claim 7 wherein the control information is received on the anchor carrier to control a transition of the non-anchor carrier from the first DRX state where the UE does not monitor system signaling on the non-anchor carrier over multiple DRX cycles to the second DRX where the UE is required to periodically monitor system signaling on the non-anchor carrier.

* * * * *

UNITED STATES PATENT AND TRADEMARK OFFICE
CERTIFICATE OF CORRECTION

PATENT NO. : 8,767,604 B2  
APPLICATION NO. : 13/258275  
DATED : July 1, 2014  
INVENTOR(S) : Pelletier et al.

Page 1 of 1

It is certified that error appears in the above-identified patent and that said Letters Patent is hereby corrected as shown below:

On the Title Page, in Item (75), under "Inventors", in Column 1, Line 3, delete "Bjarred" and insert -- Bjärred --, therefor.

In The Specification

In Column 1, Line 63, delete "$RRC_{13}$" and insert -- RRC --, therefor.

In Column 2, Line 23, delete "RTI" and insert -- RTT --, therefor.

In Column 2, Line 58, delete ""claimant"" and insert -- "dormant" --, therefor.

In The Claims

In Column 8, Line 14, in Claim 3, delete "to 1," and insert -- to claim 1, --, therefor.

Signed and Sealed this  
Twentieth Day of January, 2015

Michelle K. Lee  
*Deputy Director of the United States Patent and Trademark Office*